United States Patent
Racha et al.

(10) Patent No.: US 9,854,432 B2
(45) Date of Patent: Dec. 26, 2017

(54) METHOD AND APPARATUS FOR SELECTIVE MOBILE APPLICATION LOCKOUT

(71) Applicant: Ford Global Technologies, LLC, Dearborn, MI (US)

(72) Inventors: Srini Racha, Northville, MI (US); David Marvin Gersabeck, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/489,941

(22) Filed: Sep. 18, 2014

(65) Prior Publication Data
US 2016/0088469 A1    Mar. 24, 2016

(51) Int. Cl.
*H04W 8/22* (2009.01)
*H04W 4/04* (2009.01)
*H04M 1/60* (2006.01)
*H04M 1/725* (2006.01)

(52) U.S. Cl.
CPC ......... *H04W 8/22* (2013.01); *H04M 1/72577* (2013.01); *H04W 4/046* (2013.01); *H04M 1/6075* (2013.01); *H04M 1/72569* (2013.01); *H04M 2250/10* (2013.01)

(58) Field of Classification Search
CPC ......... H04M 1/72577; H04M 1/72563; H04M 1/72569; H04M 2250/12; H04M 2242/30; H04M 3/38; H04M 3/42348; H04M 3/2281; H04W 4/02; H04W 4/027; H04W 48/02; H04W 48/04; H04W 64/00
USPC ....................................................... 455/418
See application file for complete search history.

(56) References Cited

U.S. PATENT DOCUMENTS

| | | | |
|---|---|---|---|
| 8,620,354 B2 * | 12/2013 | Beasley | 455/456.4 |
| 8,914,012 B2 * | 12/2014 | Crosbie et al. | 455/418 |
| 9,026,780 B2 * | 5/2015 | Ewell et al. | 713/100 |
| 9,060,072 B2 * | 6/2015 | Hynes et al. | |
| 9,088,865 B2 * | 7/2015 | Vaccari et al. | |
| 2005/0255874 A1 | 11/2005 | Stewart-Baxter et al. | |
| 2009/0224931 A1 | 9/2009 | Dietz et al. | |
| 2010/0113073 A1 * | 5/2010 | Schlesener et al. | 455/466 |
| 2012/0244849 A1 | 9/2012 | Thomson | |
| 2013/0172018 A1 | 7/2013 | Correale et al. | |

\* cited by examiner

*Primary Examiner* — Siu Lee
(74) *Attorney, Agent, or Firm* — Jennifer Stec; Brooks Kushman P.C.

(57) ABSTRACT

A system includes a processor configured to determine that an application is running in a foreground. The processor is also configured to receive a mobile device speed. The processor is additionally configured to determine if the mobile device speed is above a predetermined threshold. Also, the processor is configured to determine if an interface threshold has been exceeded and lock out the application from use if the mobile device speed is above the predetermined threshold and the interface threshold has been exceeded.

14 Claims, 3 Drawing Sheets

METHOD AND APPARATUS FOR SELECTIVE MOBILE APPLICATION LOCKOUT

TECHNICAL FIELD

The illustrative embodiments generally relate to a method and apparatus for selective mobile application lockout.

BACKGROUND

With advanced connected services in vehicles, there are numerous opportunities for a driver to be distracted while driving. The driver can be focused on navigation input/control, media selection, data retrieval or other vehicle features, instead of being focused on the road. To counteract this risk, many vehicles selectively disable interactive features while a vehicle is in motion, to avoid undue driver distraction. Unfortunately, there are other sources of driver distraction as well, a primary one of which includes portable devices.

U.S. Application Publication 2005/0255874 generally relates to a system and method for detecting motion of a cell phone and disabling the use of the cell phone while moving or driving. The inventive system includes: a cell phone; a sensor to detect motion of the cell phone; software in the cell phone to disable the use of the cell phone when motion is detected. In a preferred embodiment, the system also recognizes the near proximity of an automobile and disables the use of the cell phone in this near proximity.

U.S. Application Publication 2009/0224931 generally relates to a mobile device configured to have at least one function disabled when a speed of the mobile device exceeds a threshold. The mobile device includes an output component configured to provide a notification related to disabling the at least one function. The mobile device also includes a first input component configured to promote controlling whether to disable the at least one function.

SUMMARY

In a first illustrative embodiment, a system includes a processor configured to determine that an application is running in a foreground. The processor is also configured to receive a mobile device speed. The processor is additionally configured to determine if the mobile device speed is above a predetermined threshold. Also, the processor is configured to determine if an interface threshold has been exceeded and lock out the application from use if the mobile device speed is above the predetermined threshold and the interface threshold has been exceeded.

In a second illustrative embodiment, a computer-implemented method includes determining that an application is running in a foreground. The method also includes receiving a mobile device speed. Further, the method includes determining if the mobile device speed is above a predetermined threshold. The method additionally includes determining if an interface threshold has been exceeded and locking out the application from use if the mobile device speed is above the predetermined threshold and the interface threshold has been exceeded.

In a third illustrative embodiment, a non-transitory computer-readable storage medium stores instructions that, when executed, cause a processor to perform a computer-implemented method including determining that an application is running in a foreground. The method also includes receiving a mobile device speed. Further, the method includes determining if the mobile device speed is above a predetermined threshold. Additionally, the method includes determining if an interface threshold has been exceeded and locking out the application from use if the mobile device speed is above the predetermined threshold and the interface threshold has been exceeded.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
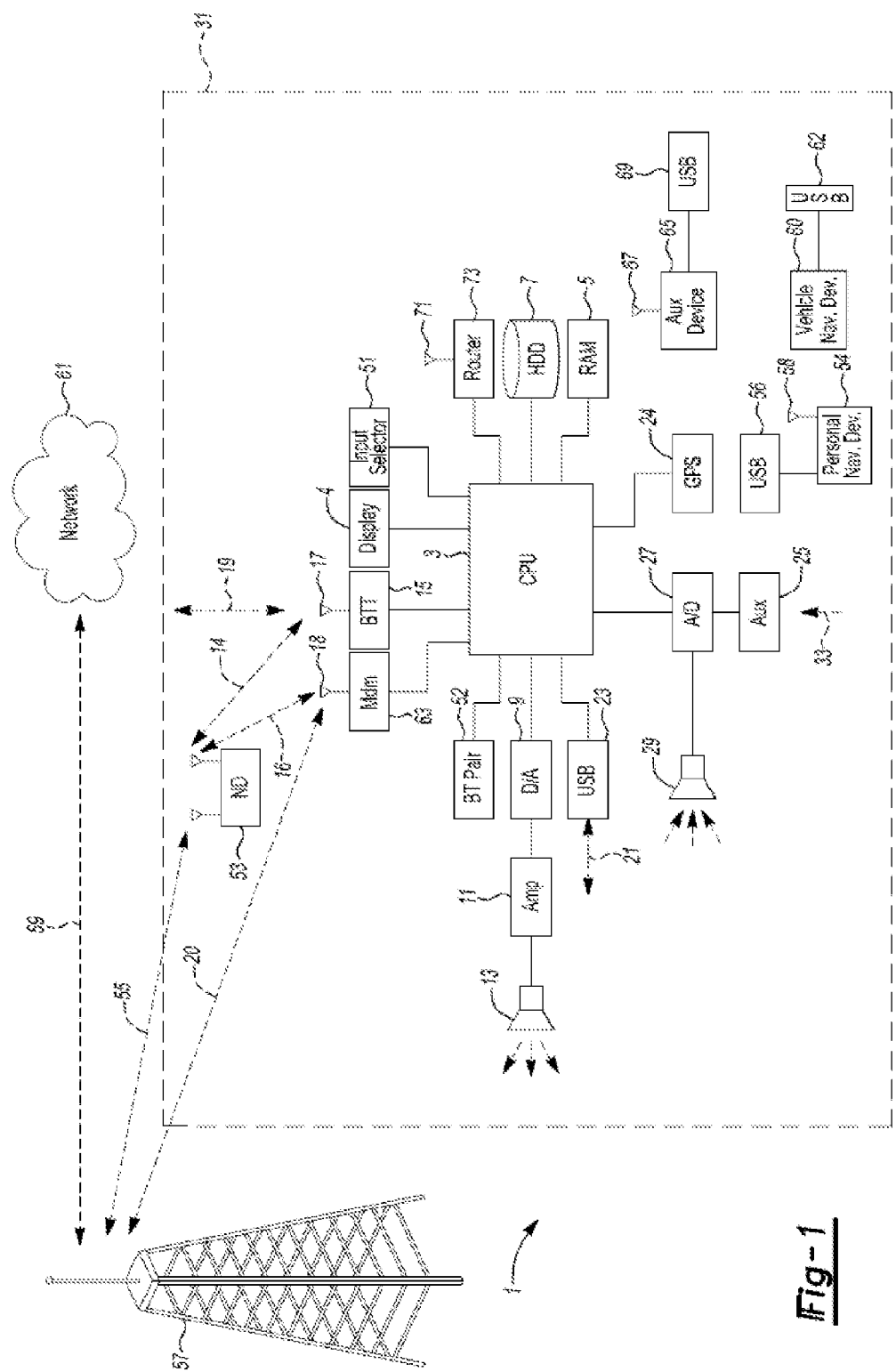
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

The illustrative embodiments provide for selective lockout of mobile applications. Instead of merely disabling all applications when a vehicle is in motion (and thus a mobile device is in motion), only applications determined to be providing too much driver distraction will be disabled, in at least one embodiment.

In the examples, an application running on the mobile device tracks device speed through mobile device sensors and/or receives vehicle speed data from a connected vehicle computing system. It is also possible for the vehicle computing system to instruct launch of the controlling application once a vehicle is in a drive state. This could be, for example, an instruction sent to a connected device, or, for example, sent to a device identified as a driver device. Identification of the device (when multiple devices are present) as a driver device can be done through a variety of known techniques.

Figure 2:
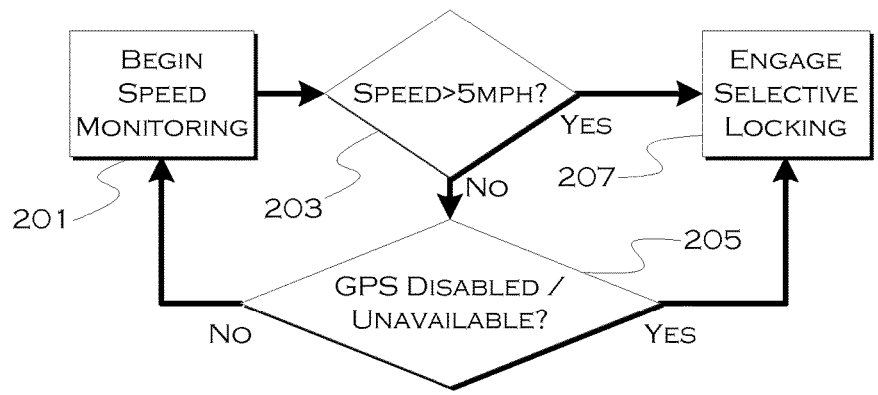
FIG. 2 shows an illustrative example of a lockout initiation process.

FIG. 2 shows an illustrative example of a lockout initiation process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In the illustrative examples, monitoring and lockout are performed by the application running on the mobile device, but a similar application could be run on the vehicle and lockout instructions could be passed to the mobile device from the application, based on data received from the mobile device corresponding to the lockout requirements of the application.

In this illustrative example, the process monitors the instant speed of the mobile device (which should correspond to vehicle speed) 201. If the mobile device moves above five miles per hour (or any other suitable predetermined threshold) 203, the process will engage selective lockout 207. Also, in this example, if the user has disabled, or failed to enable, a GPS sensor (allowing for speed detection) 205, the process will also engage selective lockout. This and other similar, suitable failsafes can be provided to avoid accidental or intentional prevention of selective lockout engagement.

Figure 3:
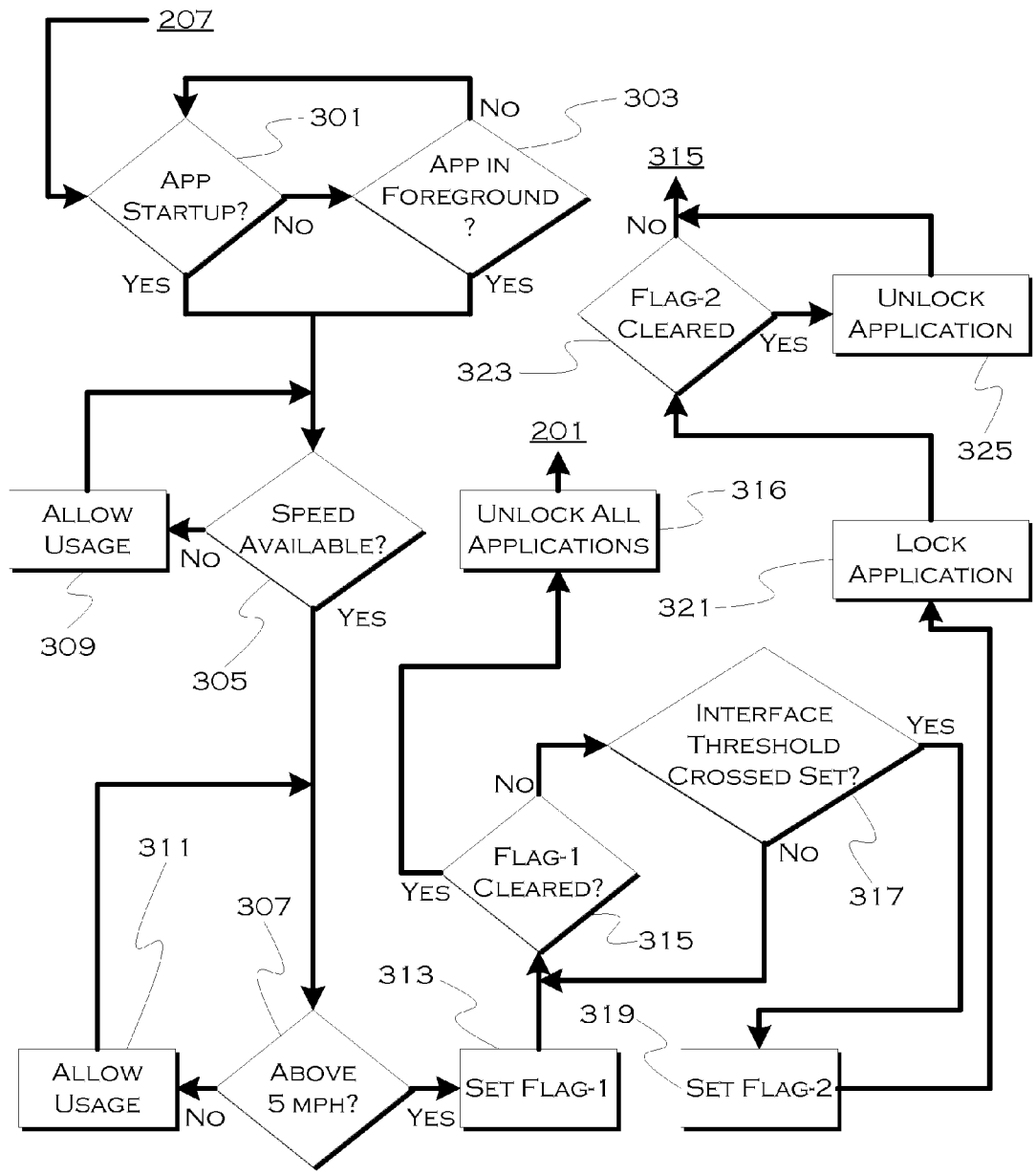
FIG. 3 shows an illustrative example of a lockout process.

FIG. 3 shows an illustrative example of a lockout process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the selective lockout 207 is shown in greater detail, in the form of a non-limiting example. In this embodiment, the process is concerned with locking out applications that are running in the foreground (providing for user interaction). Thus, if an application is started 301 or if an application is moved to or running in the foreground 303, the process will proceed to determine whether or not lockout is appropriate.

In this example, if the application is not in the foreground, the process does not address lockout of the application, since the application is not presumably distracting to the user. If, however, a background application were distracting in some way, it could also be addressed under the parameters for lockout.

Once an application is in the foreground, the process will check to see if a vehicle speed is available. If no speed is received (assuming GPS is not merely disabled) 305, the process will permit usage of the applications 309 in this embodiment, because it is assumed the user is on-foot and in a location where coordinates are simply not available. Other appropriate actions can be taken based on determinations of whether or not it is likely a user is driving or on foot.

Once a vehicle speed has been received, the process will wait until the speed exceeds five miles per hour, in this embodiment 307 (although any suitable speed could be used as a basis). As long as the speed is below five miles per hour, or any other suitable threshold, the process will permit usage of the application 311, due to the driver moving at such a low speed that distraction is not likely a safety issue.

Once a vehicle speed above the threshold has been received, the process will set a first flag 313 or take other similar steps to note that the first condition has been met. In the illustrative embodiments, vehicle movement alone does not lock out applications, secondary indicia is also utilized to determine lockout conditions.

Since some applications are useful to a driver, without distracting a driver overly much, the applications may not be locked out unless they represent a particular level of distraction. For example, if a driver interacts with an application prior to driving, and the application provides data to the driver while driving, there may be no reason to lock out the application. On the other hand, if the driver is actively attempting to type within an application while driving, this could be very distracting and thus may trigger lockout.

Once the first flag is set, the process makes sure this flag hasn't been cleared 315 (e.g., the vehicle has dropped below five miles per hour or other threshold). If the first condition is still met, the process checks to see if application interface exceeds a predetermined threshold 317. For example, without limitation, mere use of a keyboard or keypad input (digital or physical keypad) may cross the threshold. In other examples, interacting with an application (e.g., without limitation, tapping the screen or otherwise providing input)

may be measured, and if excessive input is detected over a predefined period of time, the application may be deemed unduly distracting and thus subject to lock out.

If the input threshold has been exceeded, the process sets a second flag (or takes other suitable action) 319. In this example, once both conditions have been met, at the same time, the process will lock out the offending application 321 (e.g., the foreground application). This may result in suspension of the application, or may, for example, merely result in lock-out of device input for the application. In this example, if the user ceases using the keypad or other input for a sufficient period of time, the process will clear the second flag 323. If the second flag (or the first flag) is cleared, e.g., the conditions are no longer met, the process may unlock the application 325. For the duration of the drive, the controlling application monitors the variables to determine if foreground applications should be locked-out.

Figure 4:
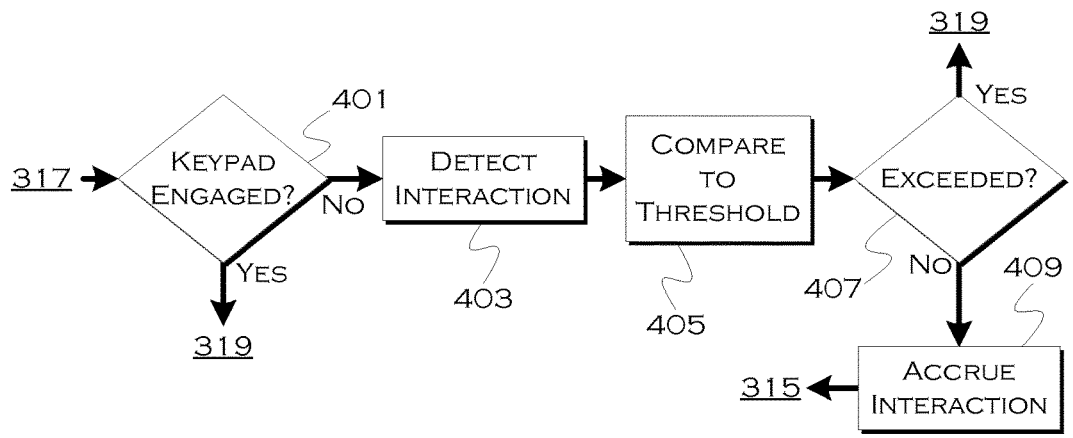
FIG. 4 shows an illustrative example of an interaction detection process.

FIG. 4 shows an illustrative example of an interaction detection process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this example, the keypad is either not engaged 401, and if the keypad is engaged, the process will proceed to set the second condition as met. On the other hand, if the user is interacting with the application without use of the keypad, the process will detect other device/application interaction 403.

The accrued amount of interaction (e.g., number of taps, clicks, duration of interactions), will be compared to an interaction threshold 405. The interaction threshold defines, for example, a permissible amount of input within a predetermined amount of time (e.g., N clicks per X minutes/seconds). If the interaction threshold is crossed 407, the process will proceed to set the second condition as met. If the threshold is not crossed, the process will add the interaction to the accrued interactions 409 and continue to measure a level of input.

Figure 5:
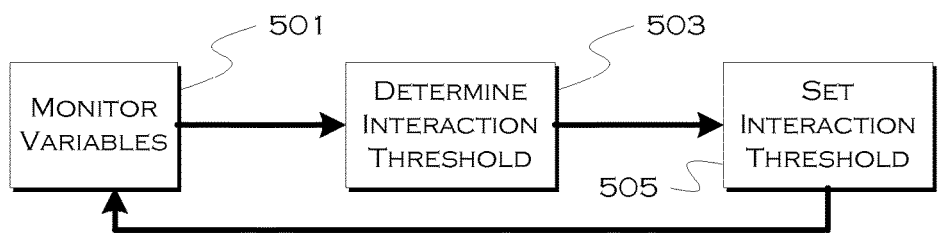
FIG. 5 shows an illustrative example of an interaction threshold setting process.

FIG. 5 shows an illustrative example of an interaction threshold setting process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process sets the interaction threshold based on a level of driver distraction. Driver distraction can be defined by speed, traffic, environmental conditions, etc. When driver distraction is higher, the threshold may be lower, and vice versa. Any variables that can control the interaction threshold are monitored by the process 501. Based on the values of these variables, and any other suitable control factors, the process determines an appropriate interaction threshold 503. For example, if the vehicle is traveling at fifteen miles per hour, in clear weather with no traffic, the threshold might be set at ten clicks per minute. On the other hand, if the vehicle is traveling at fifty miles per hour, in high traffic and rain, interaction may be limited to one click per minute (the specific clicks per minutes and affecting variables are provided for illustrative purposes only). The determine threshold is set 505, and the process continues to monitor the variables and adjust the settings accordingly.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
    a processor, in communication with a mobile device including a screen interface, configured to:
    receive a mobile device speed;
    determine whether the mobile device speed is above a predetermined threshold;
    determine whether a user has touched the device screen more than a threshold number of times; and
    lock out a foreground application from use if the mobile device speed is above the predetermined threshold and the user has touched the device screen more than a threshold number of times within a threshold time period.

2. The system of claim 1, wherein the processor is configured to receive the mobile device speed by determining a rate of change in detected GPS coordinates.

3. The system of claim 1, wherein the processor is configured to unlock a locked-out application if the mobile device speed falls below the predetermined threshold.

4. The system of claim 1, wherein the threshold time period varies with a level of driver distraction.

5. The system of claim 1, wherein the threshold number of times varies with a level of driver distraction.

6. The system of claim 4, wherein the level of driver distraction is dependent on at least one of a speed, traffic level or environmental condition.

7. The system of claim 5, wherein the level of driver distraction is dependent on at least one of a speed, traffic level or environmental condition.

8. A computer-implemented method comprising:
    determining that a mobile device speed is above a predetermined threshold;
    determining that number of characters typed exceeds a permissible number of characters typed within a threshold time period; and
    locking out a foreground application from use when the mobile device speed is above the predetermined threshold and the number of characters typed exceeds the permissible number of characters typed within the threshold time period.

9. The method of claim 8, further comprising unlocking a locked-out application when the mobile device speed falls below the predetermined threshold or when the number of characters typed falls below the permissible number of characters typed over the threshold time period.

10. The method of claim 8, wherein the permissible number of characters typed varies with respect to a measured level of driver distraction, such that more characters are permitted at lower levels of driver distraction.

11. The method of claim 8, wherein the threshold time period varies with respect to a measured level of driver distraction, such that the time period is shorter at lower levels of driver distraction.

12. A non-transitory computer-readable storage medium, storing instructions that, when executed, cause a processor to perform a computer-implemented method comprising:
   determining when a mobile device speed exceeds a predetermined threshold;
   determining that a total aggregated number of all user-interface interactions exceeds a permissible number of interactions within a predetermined time period; and
   locking out a foreground application from use responsive to the mobile device speed exceeding the predetermined threshold and the total aggregated number of all user-interface interactions exceeding the permissible number of interactions within the predetermined time period.

13. The storage medium of claim 12, wherein the permissible number of interactions varies with respect to a measured level of driver distraction, such that more characters are permitted at lower levels of driver distraction.

14. The storage medium of claim 12, wherein the threshold time period varies with respect to a measured level of driver distraction, such that the threshold time period is shorter at lower levels of driver distraction.

* * * * *